(12) United States Patent
Milani et al.

(10) Patent No.: US 10,993,450 B2
(45) Date of Patent: *May 4, 2021

(54) PROCESSES FOR REMOVAL OF LACTOSE FROM DRIED MILK PRODUCTS

(71) Applicant: Wisconsin Alumni Research Foundation, Madison, WI (US)

(72) Inventors: Franco Milani, De Forest, WI (US); Byron Toledo Davalos, Twin Falls, ID (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/007,596

(22) Filed: Jun. 13, 2018

(65) Prior Publication Data

US 2018/0289026 A1 Oct. 11, 2018

Related U.S. Application Data

(63) Continuation of application No. 13/768,717, filed on Feb. 15, 2013, now Pat. No. 10,051,873.

(60) Provisional application No. 61/599,207, filed on Feb. 15, 2012.

(51) Int. Cl.
*A23C 9/14* (2006.01)

(52) U.S. Cl.
CPC ..................... *A23C 9/14* (2013.01)

(58) Field of Classification Search
CPC ..................................................... A23C 9/14
See application file for complete search history.

(56) References Cited

U.S. PATENT DOCUMENTS

| 2,330,793 A | 9/1943 | Peebles et al. |
| 2,627,463 A | 2/1953 | Meade |
| 2,710,808 A | 6/1955 | Peebles et al. |
| 5,397,589 A | 3/1995 | Korte et al. |
| 6,139,901 A | 10/2000 | Blazey |

OTHER PUBLICATIONS

Agrawal, S. G., Mcleod, J., Paterson, A. H. J., & Jones, J. R. (2011). Secondary nucleation studies on lactose: A mechanistic understanding. *Chemeca 2011: Engineering a Better World: Sydney Hilton Hotel, NSW, Australia*, Sep. 18-21, 2011, 677.

Aguilera, J. M., Crisafulli, E. B., Lusas, E. W., Uebersax, M. A., & Zabik, M. E. (1984). Air classification and extrusion of navy bean fractions. *Journal of Food Science*, 49(2), 543-546.

Alvarez, V. B., Wolters, C. L., Vodovotz, Y., & Ji, T. (2005). Physical properties of ice cream containing milk protein concentrates. *Journal of Dairy Science*, 88(3), 862-871.

(Continued)

*Primary Examiner* — Subbalakshmi Prakash
(74) *Attorney, Agent, or Firm* — Daniel A. Blasiole; DeWitt LLP

(57) ABSTRACT

Disclosed are processes for removing lactose from dried milk products to produce dried protein fortified and/or mineral fortified milk products having a reduced lactose content with minimal use, or even without the use, of membrane ultrafiltration, diafiltration, or additional drying equipment. Additionally, a high lactose-containing stream product is also produced. The dried protein fortified milk products are physically and chemically similar to dried milk protein concentrates and can be used for protein fortifiers in various food applications.

15 Claims, 15 Drawing Sheets

(56) References Cited

OTHER PUBLICATIONS

Anderson, D. L., Mistry, V. V., Brandsma, R. L., & Baldwin, K. A. (1993). Reduced Fat Cheddar Cheese from Condensed Milk. 1. Manufacture, Composition, and Ripening1. *Journal of Dairy Science*, 76(10), 2832-2844.

Bhargava, A., & Jelen, P. (1996). Lactose solubility and crystal growth as affected by mineral impurities. *Journal of Food Science*, 61(1), 180-184.

Bolanowski, J. P. (1965). Controlled Crystallization—Key to Product Quality. *Food Engineering*, 37, 56-60.

Ferrer, M. A., Hill, A. R., & Corredig, M. (2008). Rheological properties of rennet gels containing milk protein concentrates. *Journal of dairy science*, 91(3), 959-969.

Fox, P. F., McSweeney, P. L., & Paul, L. (1998). *Dairy chemistry and biochemistry* (No. 637 F6.). London: Blackie Academic & Professional.

Getler, J., Nielsen, A., & Sprogø, J. (1996). Powdered milk protein concentrate. *Scandinavian Dairy Information* (*Sweden*).

Guinee, T. P., Pudja, P. D., & Mulholland, E. O. (1994). Effect of milk protein standardization, by ultrafiltration, on the manufacture, composition and maturation of Cheddar cheese. *Journal of Dairy Research*, 61(1), 117-131.

Harvey, J. (2006). Protein fortification of cheese milk using milk protein concentrate-yield improvement and product quality. *Australian journal of dairy technology*, 61(2), 183.

Hayes, M. C., & Boor, K. (2001). Raw milk and fluid milk products. *Food Science and Technology—New York—Marcel Dekker-*, 59-76.

Huffman, L. M., & Harper, W. J. (1999). Maximizing the value of milk through separation technologies. *Journal of dairy science*, 82(10), 2238-2244.

Jelen, P., & Coulter, S. T. (1973). Effects of certain salts and other whey substances on the growth of lactose crystals. *Journal of Food Science*, 38(7), 1186-1189.

Klumpar, I. V., Currier, F. N., & Ring, T. A. (1986). Air classifiers. *Chemical engineering*, 93(5), 77-92.

Martinez, E., Hough, G., & Contarini, A. (1990). Sandiness prevention in dulce de leche by seeding with lactose microcrystals. *Journal of dairy science*, 73(3), 612-616.

Mistry, V. V., & Hassan, H. N. (1991). Delactosed, High Milk Protein Powder. 1. Manufacture and Compositionl. *Journal of Dairy Science*, 74(4), 1163-1169.

Mistry, V. V., & Hassan, H. N. (1991). Delactosed, high milk protein powder. 2. Physical and functional Properties1. *Journal of dairy science*, 74(11), 3716-3723.

Mistry, V. V., & Hassan, H. N. (1992). Manufacture of Nonfat Yogurt from a High Milk Protein Powder1. *Journal of Dairy Science*, 75(4), 947-957.

Mistry, V. V. (2002). Manufacture and application of high milk protein powder. *Le Lait*, 82(4), 515-522.

Modler, H. W., & Kalab, M. (1983). Microstructure of yogurt stabilized with milk proteins. *Journal of Dairy Science*, 66(3), 430-437.

Muir, D. D., & Banks, J. M. (1985). Developments in membrane technology. *International Journal of Dairy Technology*, 38(4), 116-119.

Nickerson, T. A., & Moore, E. E. (1974). Factors influencing lactose crystallization. *Journal of Dairy Science*, 57(11), 1315-1319.

Nisshing, E. (2010). Air Classifier, Turbo Classifier. In http://www.nisshineng.com/eng/.

Rehman, S. U., Farkye, N. Y., Considine, T., Schaffner, A., & Drake, M. A. (2003). Effects of standardization of whole milk with dry milk protein concentrate on the yield and ripening of reduced-fat Cheddar cheese. *Journal of dairy science*, 86(5), 1608-1615.

Farkye, N. Y., & Yim, B. (2003). Use of dry milk protein concentrate in pizza cheese manufactured by culture or direct acidification. *Journal of dairy science*, 86(12), 3841-3848.

Smith, K. (2017). *Dried dairy ingredients*. Wisconsin Center for Dairy Research.

Surh, J., Ward, L. S., & McClements, D. J. (2006). Ability of conventional and nutritionally-modified whey protein concentrates to stabilize oil-in-water emulsions. *Food Research International*, 39(7), 761-771.

Trinh, B., Haisman, D., & Trinh, K. T. (2007). Rheological characterisation of age thickening with special reference to milk concentrates. *Journal of dairy research*, 74(1), 106-115.

US Food and Drug Administration. (2009). Grade "A" pasteurized milk ordinance. *US Food and Drug Administration, Washington, DC*, 52.

Vu, T. T. L., Durham, R. J., Hourigan, J. A., & Sleigh, R. W. (2006). Dynamic modelling optimisation and control of lactose crystallisations: Comparison of process alternatives. *Separation and purification technology*, 48(2), 159-166.

Walstra, P., Geurts, T. J., Walstra, P., & Wouters, J. T. (2005). *Dairy science and technology*. CRC press.

Wong, S. Y., Rajesh, K. B., Connelly, R. K., & Hartel, R. W. (2011). *A systematic approach to optimization of industrial lactose crystallization* (Doctoral dissertation, University of Wisconsin--Madison).

FIG. 2
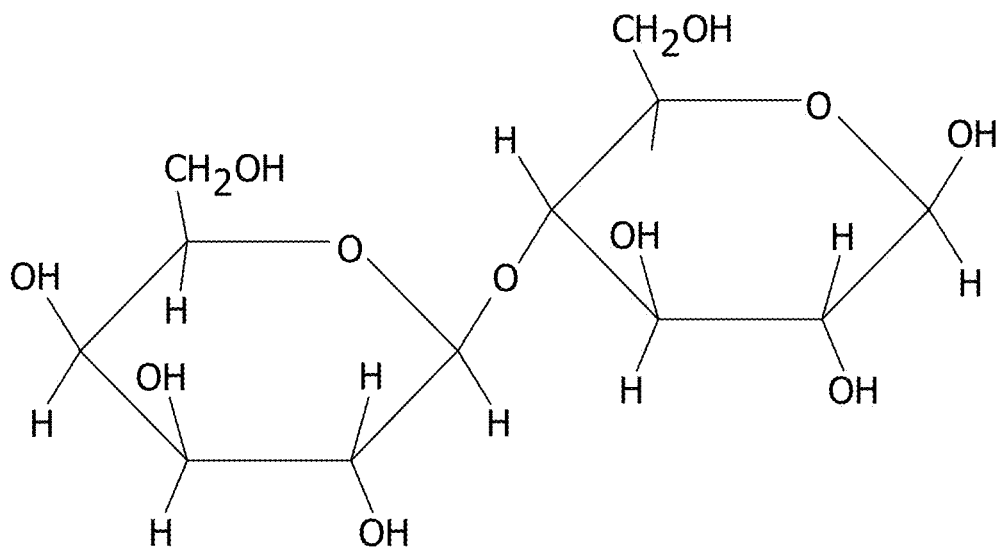
α-lactose
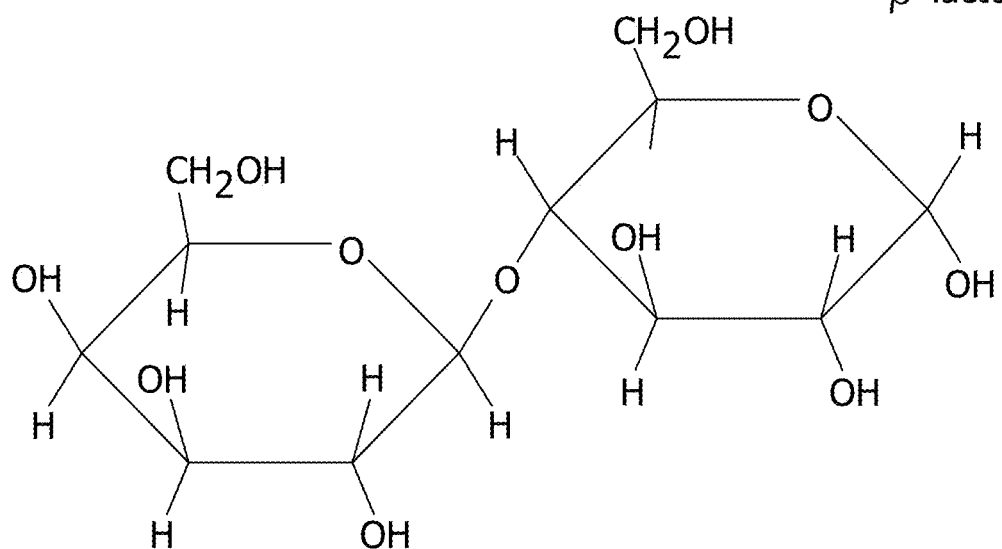
β-lactose

U SHAPED AGITATOR WITH r = 5 cm 29 cm

FIG. 5C    CHEMICAL ANALYSIS OF CONTROL SAMPLE

| | PROTEIN % | LACTOSE % |
|---|---|---|
| CONTROL SAMPLE PRIOR TO AIR CLASSIFICATION | 35.30 | 53.30 |
| CONTROL COARSE STREAM | 34.20 | 54.36 |
| CONTROL FINE STREAM | 34.70 | 53.84 |

FIG. 5F

CHEMICAL ANALYSIS OF TEST SAMPLE

| | PROTEIN % | LACTOSE % |
|---|---|---|
| TEST SAMPLE PRIOR TO AIR CLASSIFICATION | 35.30 | 53.30 |
| TEST COARSE STREAM | 34.00 | 53.13 |
| TEST FINE STREAM | 36.8 | 50.19 |

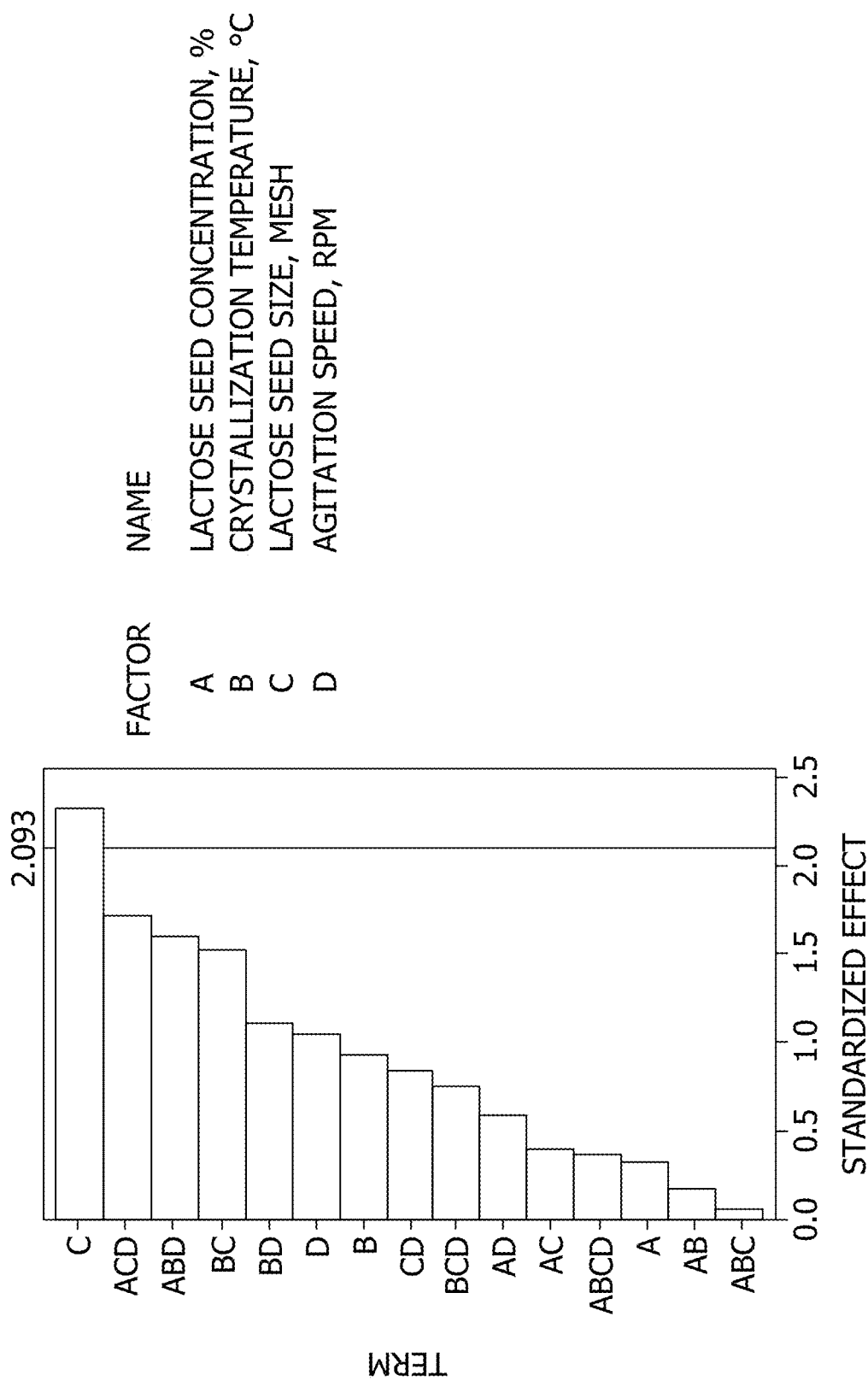

PROCESSES FOR REMOVAL OF LACTOSE FROM DRIED MILK PRODUCTS

CROSS-REFERENCE TO RELATED APPLICATIONS

This application is a continuation of U.S. application Ser. No. 13/768,717 filed Feb. 15, 2013, and issued as U.S. Pat. No. 10,051,873, which claims priority from U.S. Provisional Patent Application Ser. No. 61/599,207, filed Feb. 15, 2012, each of which is herein incorporated by reference in its entirety.

BACKGROUND OF THE DISCLOSURE

The present disclosure generally relates to processes for removing lactose from dried milk products. More particularly, the present disclosure is directed to processes for removing lactose from dried milk products, and in particular, skim milk powder, to produce dried protein fortified and mineral fortified milk products having reduced lactose. The present disclosure is additionally directed to dried protein fortified milk products with reduced lactose content prepared using these processes.

Skim milk powders, which provide a method of storing and moving surplus skim milk, have conventionally been used by food manufactures for protein fortification of formulated food products. The protein fraction of skim milk powder, which accounts for approximately 36% by weight of the powder, contains caseins and whey proteins in about a 5:1 ratio, respectively. The use of skim milk powders in many of these food applications is limited, however, as the powders include a high lactose content, accounting for approximately 51% to 56% by weight of the powder, which can potentially jeopardize the quality of the final food product through lactose crystallization.

More particularly, the chemical composition of concentrated skim milk prior to spray drying is well beyond the lactose supersaturation point, thus favoring lactose crystallization. Due to the kinetics of the reaction, however, the appearance of the crystals at disenable size is not common during production of skim milk powder. This is attributed to the slow rate of nucleation of the crystals and the conditions typically employed in the production of dried skim milk that disfavor crystal growth. If the concentrated skim milk is held for some time at lower temperatures before spray drying, however, lactose will eventually crystallize.

Previous attempts to overcome the above shortcomings have included turning to the use of dried milk protein concentrates having reduced lactose and mineral contents. The casein and whey protein ratio in milk protein concentrate is typically similar to skim milk powder, allowing the milk protein concentrate to have the same, or similar, functional properties as skim milk powder with reduced potential for lactose crystallization.

Manufacturing processes of milk protein concentrates are similar to skim milk powder with the use of concentrating and drying technologies intended to extract water from the skim milk. However, additional processing steps such as ultrafiltration (UF) are required prior to evaporation for the reduction of lactose, minerals, small molecules, and water. The UF membrane is designed with small pores that allow low molecular weight components (i.e., permeate) to pass through while large molecules (i.e., retentate) are prevented to pass though. As the UF is being applied, the skim milk solids concentration (i.e., retentate) increases, thereby increasing viscosity, to a point where the flux of components through the membrane will be reduced. The maximum level of concentration for the retentate is dependent upon membrane fouling and product viscosity, consequently affecting the efficiency of the process. At this point, the UF processing may be stopped and evaporation methods are employed to remove water, further concentrating the solids of the skim milk. Additional processing using UF may be done with the addition of water (i.e., diafiltration (DF)) to reestablish the flux and remove more lactose and minerals.

Inherent limitations of UF include fouling of the UF membrane. Further, UF membrane installations are capital intensive, require significant operating expense (i.e., cleaning and sanitation chemicals), increased water use, increased wastewater, and use excessive energy.

Accordingly, there is a need in the art to develop alternative processes for producing dried protein fortified milk products having similar protein concentrations as dried milk protein concentrates and skim milk powder, while having reduced lactose levels. Particularly, it would be advantageous to develop processes of producing the dried protein fortified milk products that require less or no membrane processing, less energy, and less water usage and wastewater.

SUMMARY OF THE DISCLOSURE

The present disclosure is generally directed to processes for removing lactose from dried milk products to produce dried protein fortified milk products having reduced lactose content. The dried protein fortified milk products can be used as alternatives to skim milk powder and dried milk protein concentrates as protein fortifiers for use in formulated food products.

In one aspect, the present disclosure is directed to a process for preparing a dried protein fortified milk product having reduced lactose content. The process comprises: reconstituting skim milk powder with water to produce a solution with about 40% solids by weight; pasteurizing the solution; cooling the pasteurized solution; crystallizing lactose in the cooled solution; spray drying the solution comprising the lactose crystals to produce a dried milk product; and separating the lactose crystals from the dried milk product to produce the dried protein fortified milk product.

In another aspect, the present disclosure is directed to a process for preparing a dried protein fortified milk product having reduced lactose content. The process comprises: pasteurizing a liquid skim milk solution having a solids content of about 40% by weight; cooling the pasteurized solution; crystallizing lactose in the solution; spray drying the solution comprising the lactose crystals to produce a dried milk product; and separating the lactose crystals from the dried milk product to form the dried protein fortified milk product.

In still another aspect, the present disclosure is directed to a dried protein fortified milk product having reduced lactose content. The dried protein fortified milk product is prepared by a process comprising: pasteurizing a skim milk solution having a solids content of about 40% by weight; cooling the pasteurized solution; crystallizing lactose in the solution; spray drying the solution comprising the lactose crystals to produce the dried milk product; and separating the lactose crystals from the dried milk product to form the dried protein fortified milk product.

It has been found that lactose can be removed from dried milk products to produce dried protein fortified milk products having a reduced lactose content with minimal use, or even without the use, of membrane ultrafiltration, diafiltration, or additional drying equipment. These production processes save energy, as measured per unit of protein concentration, as well as reduce the energy-related environmental impact, as compared to conventional milk protein concentrate production processes. Additionally, these processes reduce water use and the environmental impact of wastewater effluent, as measured per unit of protein concentration, as compared to conventional milk protein concentration production processes.

Moreover, the processes of the present disclosure may produce a dried protein fortified milk product with Class I (superior) nutrient retention and Third Group (inferior) nutrient reduction such that the dried protein fortified milk products could be labeled "Protein-Fortified Skim Milk Powder" as allowed by the Food and Drug Administration. This label could be used in standardized foods and could thus enhance "clean label" positioning of milk-based and other formulated food products.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein:

FIG. 2 depicts the α-monohydrate and β-anhydrate forms of lactose.

FIG. 5C depicts chemical analysis of Control Sample prior to and post air classification as analyzed in Example 2.

FIG. 5F depicts chemical analysis of Test Sample prior to and post air classification as analyzed in Example 2.

FIG. 9 depicts a chart of standardized effects on 24 hour crystallization response of lactose as analyzed in Example 3.

Figure 1:
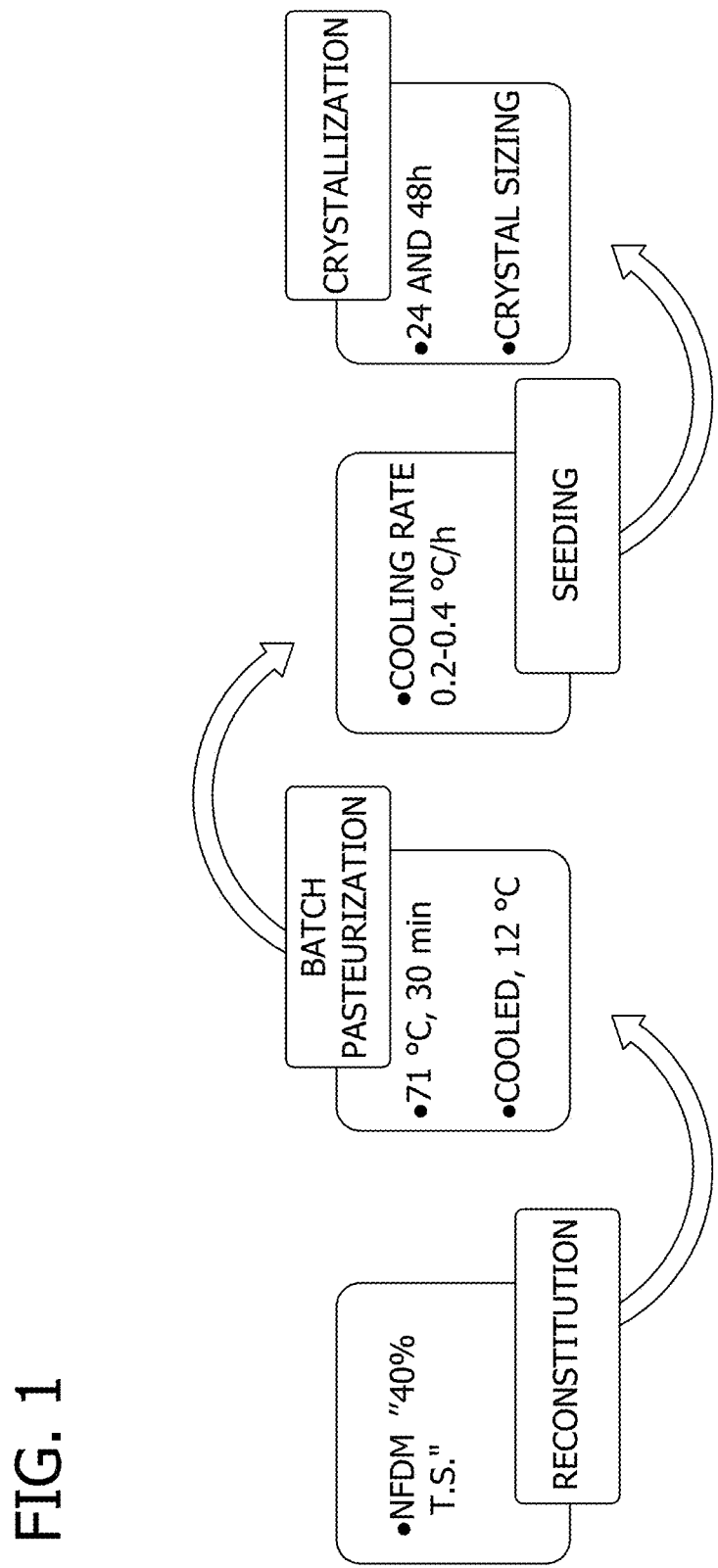
FIG. 1 depicts a flow diagram of one particular process disclosed in the present disclosure.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DETAILED DESCRIPTION

Unless defined otherwise, all technical and scientific terms used herein have the same meaning as commonly understood by one of ordinary skill in the art to which the disclosure belongs. Although any processes and materials similar to or equivalent to those described herein may be used in the practice or testing of the present disclosure, suitable processes and materials are described below.

As used herein, the term "feed stock" refers to any raw dairy or milk component for use in a large scale industrial process. Exemplary feed stocks for use in the methods of the present disclosure include whole milk, skim milk, whey, and whey permeate.

In accordance with the present disclosure, it has now been estimated that dried protein fortified milk products can be prepared having similar chemical and physical characteristics as milk protein concentrates without the use of membrane ultrafiltration, diafiltration, or additional drying equipment, thus, saving production costs, energy, and reducing environmental impact. Particularly, these processes reduce water use and the environmental impact of wastewater effluent, as measured per unit of protein concentration, as compared to conventional milk protein concentration production processes.

It should be understood that while discussed herein as removing lactose from dried milk products to produce dried protein fortified milk products, the processes described may also be used to produce a milk product having increased concentrations of other dairy components (e.g., minerals). More particularly, by removing the lactose through the use of air classifiers as described herein, fortified dairy products having higher concentrations of various dairy components may be prepared. These fortified protein products and other fortified dairy products can ultimately be used as feed stock.

Processes for Removal of Lactose

In one aspect, the present disclosure is directed to processes for removing lactose from dried milk products to produce dried protein fortified milk products having reduced lactose content. The processes of the present disclosure provide dried protein fortified milk products having similar characteristics, including protein content and lactose content, to dried milk protein concentrates, with minimal to no use of membrane filtration, thereby reducing energy expense, water use, and wastewater.

Additionally, the processes produce a second high lactose-containing product (also referred to herein as the "coarse stream"). This coarse stream may be used in foods, beverages and like nutritional applications as a lactose fortification product.

Generally, the processes of the present disclosure include: pasteurizing a skim milk solution having a solids content of about 40% by weight; cooling the pasteurized solution; crystallizing lactose in the solution; spray drying the solution comprising the lactose crystals to produce the dried milk product; and separating the lactose crystals from the dried milk product to form the dried protein fortified milk product. One particularly suitable process for use in the present disclosure is depicted in the flow diagram of FIG. 1.

A skim milk solution may be obtained from any suitable source known to one skilled in the art. In one embodiment, the solution is obtained by reconstituting a skim milk powder with water. When reconstituting a skim milk powder, it is suitable to hydrate the powder for a period of from about 12 hours to about 24 hours or more under refrigeration conditions. As used herein, the term "refrigeration conditions" refers to processing under temperatures in the range of from about 0° C. to about 7° C., and including from about 4° C. to about 7° C. This hydration period ensures the full hydration of the powdered milk; including reversal of the powder to the original milk protein and water interaction to ensure good mouthfeel of the final dried protein fortified milk product. In another embodiment, the process begins with a commercially available liquid skim milk solution having a solids content of about 40% by weight.

Once a skim milk solution is obtained, the solution is pasteurized. This method of heat treatment intends to inactivate any pathogenic microorganism and inhibit as many enzymes as possible. Pasteurization of milk products typically uses a combination of time-temperature conditions that mandates the intensity of the heat treatment. These time-temperature conditions are typically established based on inactivation of Coxiella burnetti, the most thermal resistant non-spore former currently recognized in the art (its inactivation takes place at approximately 63° C. for 30 minutes, 72° C. for 15 seconds, or 65° C. for 2 minutes). Typically, the solution is pasteurized using any suitable pasteurization method known to one skilled in the art, including, for example, low-temperature-long-time (LTLT) pasteurization, high-temperature-short-time (HTST) pasteurization, ultra pasteurization, and ultra heat treatment (UHT). Pasteurization, which may vary in time and temperature, is conducted at minimum time and temperature ranges to ensure bacterial heat deactivation. Without being limiting, suitable pasteurization times and temperatures for various milk solutions are shown in the Table below. It should be understood that all amounts are preceded by the term "about".

TABLE

Summary of the Most Common Commercial Pasteurization Methods

| Pasteurization Method | Temperature, ° C. | Holding Time |
| --- | --- | --- |
| LTLT for milk | 63 | 30 minutes |
| LTLT for products with more than 18% (w/w) total solids | 66 | 30 minutes |
| HTST for milk | 72 | 15 seconds |
| HTST for products with more than 18% (w/w) total solids | 74 | 20 seconds |
| High pasteurization | 85 | 20 seconds |
| Ultra pasteurization | 138 | 4 seconds |
| UHT | 135-150 | 5 seconds |

Suitably, in one aspect, the skim milk solution is pasteurized at a temperature of from 66° C. to about 150° C. for a period of from about 5 seconds to about 30 minutes. In one particular embodiment, the skim milk solution is pasteurized at a temperature of about 71° C. for a period of about 30 minutes.

In one aspect, the skim milk solution is tempered at room temperature for a period to activate any non-vegetative bacteria or spores present in the solution prior to pasteurization. For example, in one particular embodiment, the skim milk solution is tempered at room temperature for four hours to allow for activation of these microorganisms.

The processes of the present disclosure further include cooling the pasteurized solution. Suitably, the pasteurized solution is cooled to a temperature of 12° C. or less to allow for crystallization of the lactose in the solution and/or to condition the solution for seeding with lactose crystals. This initial cooling is typically conducted by submerging the pasteurized solution in thermostatically controlled chilled water to ensure the solution cools to a temperature of 12° C. or less. The cooling period typically will depend upon the size of the sample.

Lactose crystallization consists in the self arrangement of molecules with a regular pattern into a lattice structure. Prior to crystallization, lactose has to meet the following criteria: generation of a supersaturation state, nucleation (i.e., formation of crystalline lattice structure from solution or melt), growth, and recrystallization. Lactose can crystallize in two crystalline forms or as a non-crystalline amorphous glass. Amorphous lactose results from rapid evaporation or drying processes, wherein crystalline lactose such as α-monohydrate and β-anhydrate lactose results from slow crystallization with a temperature of less than 93.5° C. for β-monohydrate and greater than 93.5° C. for β-anhydrate. β-anhydrate lactose typically crystallizes in an uneven-sided diamond, whereas α-monohydrate typically crystallizes in a tomahawk shape (see FIG. 2). The crystallization rate, temperature, pH, viscosity, and presence of impurities (e.g., riboflavin, calcium, trace elements, salts (e.g., sodium, potassium, calcium, magnesium, chloride, phosphorus, iron, zinc, copper, manganese, and selenium salts)) in the skim milk solution can alter the shape of the crystals. By controlling the size and shape of the lactose crystals formed, and particularly, by controlling the rate of crystallization, tomahawk crystals of α-monohydrate lactose are obtained, which can provide advantages for certain food applications and processes such as improved shelf life as the tomahawk crystals, including a molecule of water, will not absorb water from atmospheric moisture.

In accordance with the above, once the pasteurized solution has been cooled to 12° C. or less, it may be suitable to further cool the pasteurized solution at a controlled cooling rate to further control the size and shape of lactose crystals formed. Suitably, the pasteurized solution is further cooled to a temperature of from about 5° C. to about 10° C. to allow for lactose crystallization. It is particularly suitable to further cool the cooled solution at a cooling rate of from about 0.2° C. to about 0.4° C. per hour continuously over a period of from about 12 hours to about 48 hours, and including from about 24 hours to about 48 hours, to allow for controlled crystallization of lactose in the cooled solution.

In one aspect, the cooled solution is agitated during cooling using any agitator as suitably known in the art. By way of example, the solution can be agitated using a U-shaped agitator (FIGS. 2A and 2B) at a speed of from about 50 rpm (approximately 5.24 radian/second) to about 100 rpm (approximately 10.47 radian/second) with an agitator angular speed of about 9 rpm (approximately 0.94 radian/second) and about 17 rpm (approximately 1.78 radian/second). Agitation during cooling promotes heat transfer within the colloidal suspension. As crystallization is an exothermic reaction, agitation aids in transferring the heat from the interior of the reactor to its outer walls. Heat will then be dissipated with the cold temperature such as from the thermostatically controlled chilled water used for cooling as described above.

As noted above, lactose generally crystallizes from solutions depending on concentration and temperature; however, lactose crystallization may not be immediate due to the slow rate of reaction, even under supersaturated conditions. Increasing the lactose concentration or decreasing the temperature of the solution, as described above, or both can enhance this reaction. Additionally, the rate of crystallization of lactose can also be increased with the addition of preformed lactose crystals (i.e., seeds). The addition of crystals, referred to as seeding, provide nucleation points that counteract the otherwise slow nucleation of lactose crystals from concentrated solutions. Preformed lactose crystals can be obtained from prior production batches or are commercially available from suppliers such as Leprino Foods (Denver, Colo.). Typically, the lactose crystals used in seeding the cooled solution are sized from about 40 mesh to about 200 mesh.

In one suitable aspect, the process includes seeding the cooled solution through the addition of from about 0.005% by weight to about 0.010% by weight lactose crystals to the cooled solution. These low seeding concentrations help to achieve the growth of large lactose crystals.

As described above, the lactose crystals formed through crystallization will vary in size and shape depending on the degree of supersaturation, temperature of crystallization, and concentration of impurities (e.g., minerals and riboflavin) in the solution. Typically, however, the lactose crystals formed in the present processes are α-monohydrate tomahawk-shaped crystals having a size of approximately 93 μm±46 μm.

Once lactose crystals have formed in the solution, the solution is spray dried to form a dried milk product. Typically, the solution is spray dried to produce a dried milk product having a moisture content of less than 5% by weight, and including from about 2.5% by weight to about 4% by weight moisture.

Any means for spray drying known in the art can be used in the processes of the present disclosure to dry the solution. In one aspect, the solution is spray dried at a temperature of from about 150° C. to about 220° C. By way of example, the solution may be spray dried in a dryer having an inlet air temperature of from about 150° C. to about 220° C. and an exhaust temperature of from about 85° C. to about 100° C. The resulting dried milk product typically has a temperature of from about 40° C. to about 60° C. when leaving the spray dryer.

Once dried, the lactose crystals are separated from the dried milk product. While the lactose crystals may be separated using any sieving method known in the art, including for example, fine mesh screening and cyclonic separators, it has been found that one significantly more efficient separation method includes an air classifier.

In one exemplary embodiment, the classification process initiates when a feed stock material of the dried product is directly and continuously fed into the classifier. The feed stock material is introduced into the classifying chamber through a conduit on the top of the classifier. As the feed stock material enters the chamber, the material is mixed with upwardly moving air generated from external blowers and introduced to the system through an annular conduit equipped with screens and baffles. The upright air flow promotes the separation of coarse and fine particles by dropping the coarse particles to the bottom of the chamber. Fine particles are aerodynamically dragged into a discharge conduit and delivered to a cyclone that separates the air and fine stream. Accordingly, in one particularly suitably aspect, the lactose crystals are separated using an air classifier, for example, the Turbo Classifier, commercially available from Nisshin Engineering Inc. (Tokyo, Japan). Another suitable commercially available air classifier includes an air classifier from RSG, Inc. (Sylacauga, Ala.).

It should be understood by one skilled in the art that while discussed as a singular separation process, the lactose crystals may be separated using a series of separation processes. For example, in one desired embodiment, the lactose crystals are separated using a process of air classifiers in series. In another embodiment, the lactose crystals are separated by running the dried milk product through a separator (e.g., air classifier) multiple times.

By separating the lactose crystals, a dried protein fortified milk product having a reduced lactose content is produced. This product, also referred to herein as the fine stream, includes proteins and non-crystallized lactose, among other small components, having a size of from about 20 μm to about 50 μm. Also produced is a high lactose containing coarse stream including the larger lactose crystals removed from the dried protein fortified milk product.

It should be understood by one skilled in the art that parameters used in the processing conditions described herein can adjusted such as to adjust flow rate through processing equipment, size of lactose crystals formed and removed from the fine stream, and the like.

Dried Protein Fortified Milk Products

In another aspect, the present disclosure is directed to a dried protein fortified milk product having a reduced lactose content prepared using the above-described processes. The dried protein fortified milk product is estimated to have similar chemical and physical properties to conventional dried milk protein concentrates. Desirably, the dried protein fortified milk product has a protein content of from about 38% by weight to about 56% by weight. In some particularly desired embodiments, the dried protein fortified milk product has a protein content of from about 38% to about 44%, and including from about 38% to about 42% by weight. In other embodiments, the dried protein fortified milk product has a protein content of from about 40% to about 56%, including from about 44% to about 56%, and even including from about 45% to about 52% by weight. Additionally, the dried protein fortified milk product typically has a ratio of casein:whey of approximately 5:1, similar to conventional milk protein concentrates.

Further, the dried protein fortified milk products prepared using the above-described processes have a reduced lactose content similar to milk protein concentrates, including an estimated lactose content of from about 35% by weight to about 56% by weight, including from about 35% by weight to about 52% by weight, including from about 35% by weight to about 46% by weight, and including from about 40% by weight to about 45% by weight lactose.

The dried protein fortified milk products having a reduced lactose content further include other components for use in food applications, such as minerals, vitamins, non-protein nitrogen compounds, mammalian metabolites, and combinations thereof.

Feed Stocks

Feed stocks including higher protein concentrations can also be prepared using the processes as described herein. Particularly, by removing the lactose and other undesirable components, a concentrated feed stock including from about 0.5% to about 50% protein on a dry weight basis can be prepared. Exemplary concentrated feed stocks are shown in the Table below.

TABLE

Exemplary Feed Stocks

| Concentrated Feed Stocks | Lactose content, % | Solids Operational Range, % |
|---|---|---|
| Whole Milk | 18.75 | 45 to 50 |
| Skim Milk | 21.47 | 38 to 42 |
| Whey | 24.42 | 30 to 34 |
| Whey permeate | 25.19 | 28 to 32 |

These feed stocks may then be used to provide concentrated sources of protein, lactose, and other dairy minerals in various foods such as process cheese, yogurt, natural cheese, ice cream, infant formulas, and animal feed.

The disclosure will be more fully understood upon consideration of the following non-limiting Examples.

EXAMPLE 1

In this Example, dried milk products including lactose crystals were prepared using the processes of the present disclosure.

Initially, skim milk powder was reconstituted with water under a temperature of from about 4° C. to about 7° C. for a period of 24 hours to form a solution having approximately 40% by weight total solids. The solution was tempered at room temperature and remained at room temperature for a period of about 4 hours. The solution was then pasteurized at a temperature of about 71° C. for a period of about 30 minutes. The pasteurized solution was then seeded with lactose crystals, agitated, and cooled to a temperature of about 12° C. to begin crystallization. Crystallization took place during the next 48 hours at a temperature of less than 10° C. and a cooling rate of approximately 0.2° C. to 0.4° C. per hour with agitation of about 50 rpm. Once the lactose had crystallized, the solution was spray dried using a spray dryer with an air inlet temperature ranging from 150° C. to 220° C. to produce a dried milk product.

The dried milk product was analyzed, and it was confirmed that lactose in the form of α-monohydrate crystals having an average particle size of 93±46 μm had formed in the dried milk products.

EXAMPLE 2

In this Example, dried milk products produced in Example 1 were analyzed prior to and after separation of the lactose crystals using an air classifier. The dried milk products produced in Example 1 and the resulting dried protein fortified milk products having reduced lactose content obtained after treatment with an air classifier were then compared to control samples of skim milk powder produced from reconstituted powdered milk.

Figure 4A:
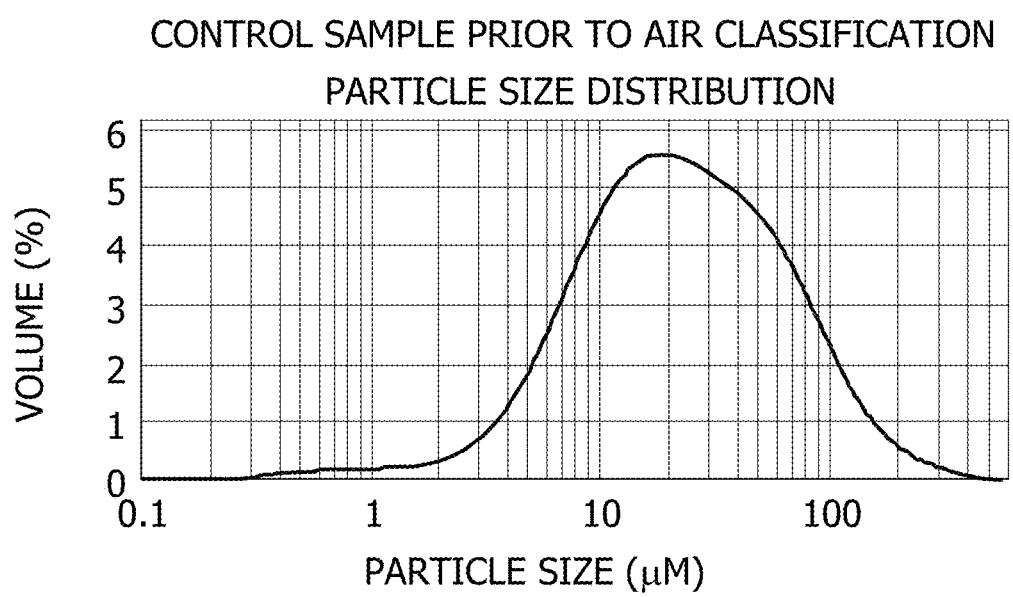
FIG. 4A depicts particle size distribution prior to air classification of Control Sample as analyzed in Example 2.
Figure 4B:
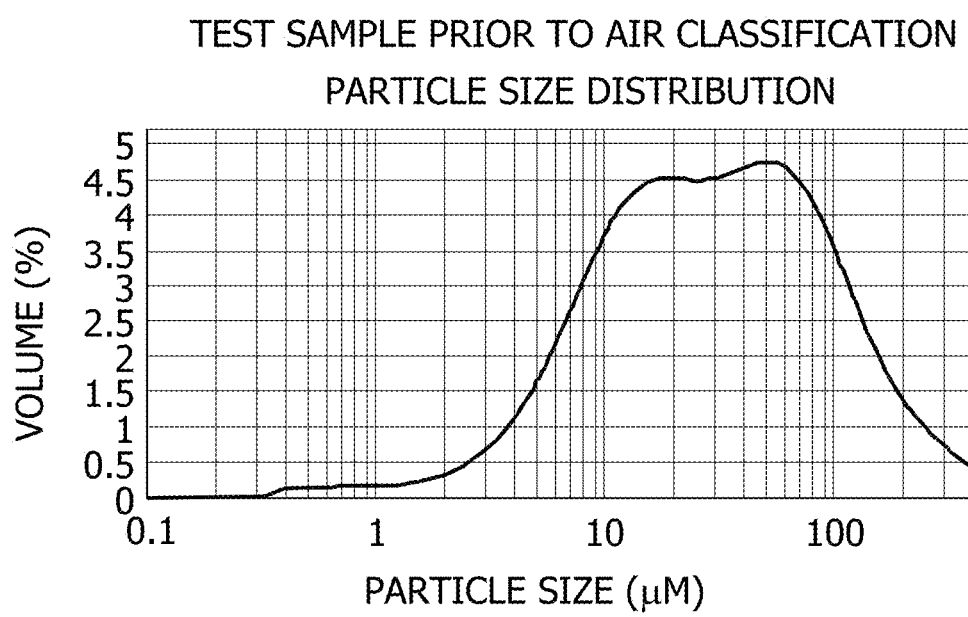
FIG. 4B depicts particle size distribution prior to air classification of Test Sample as analyzed in Example 2.
Figure 5A:
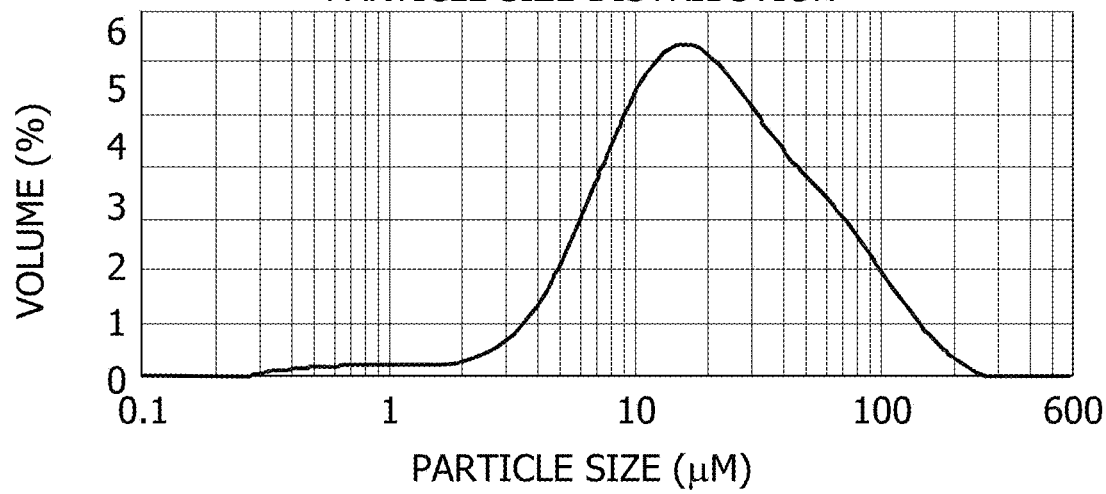
FIG. 5A depicts particle size distribution of fine stream post air classification of Control Sample as analyzed in Example 2.
Figure 5B:
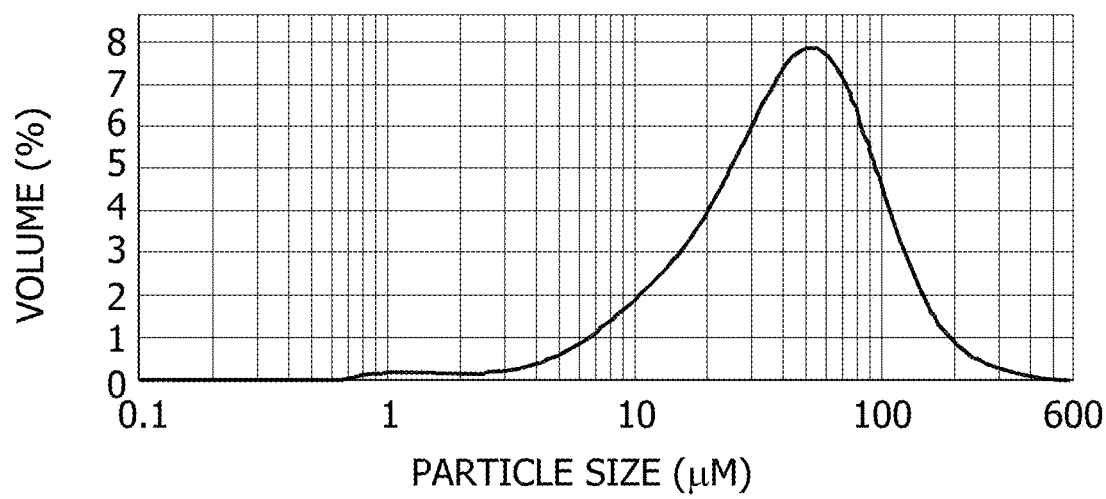
FIG. 5B depicts particle size distribution of coarse stream post air classification of Control Sample as analyzed in Example 2.
Figure 5D:
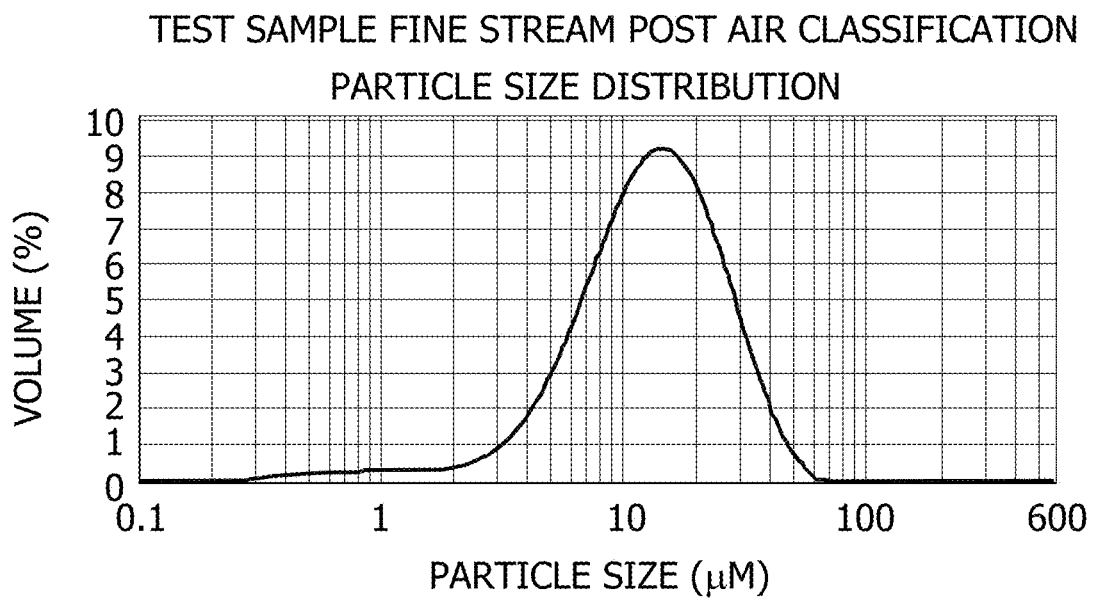
FIG. 5D depicts particle size distribution of fine stream post air classification of Test Sample as analyzed in Example 2.
Figure 5E:
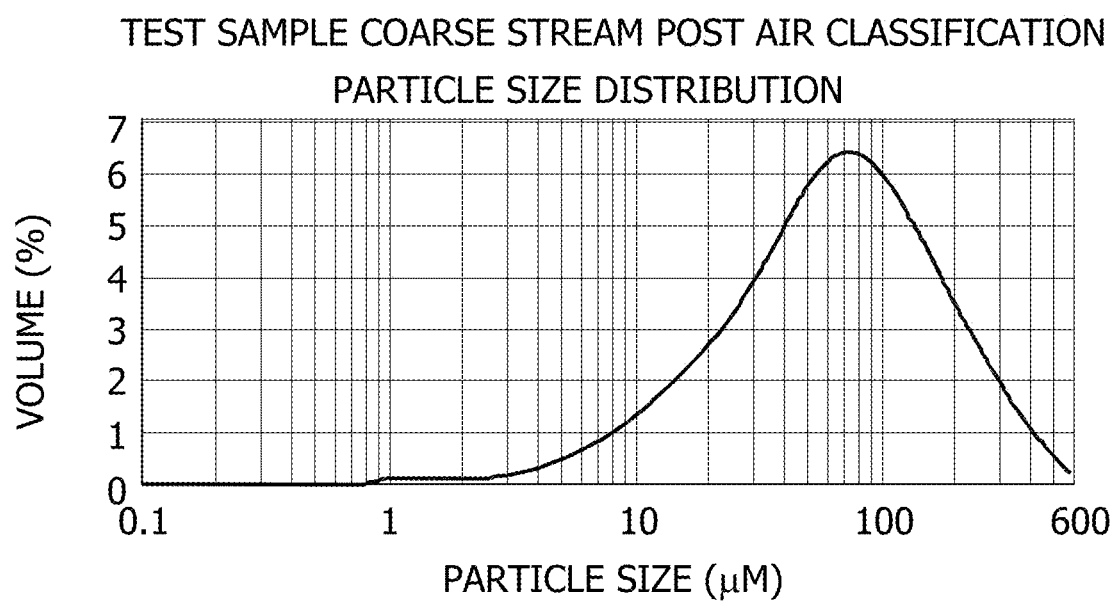
FIG. 5E depicts particle size distribution of coarse stream post air classification of Test Sample as analyzed in Example 2.

Specifically, the dried milk products of Example 1 and control samples were analyzed for particle size distribution and chemical analysis prior to air classification. The results are shown in FIGS. 4A-4B. Both the dried milk products (i.e., test samples) and control samples were then treated with an air classifier, commercially available from RSG, Inc. (Sylacauga, Ala.). Two different cut size ratios, 50:50 and 60:40, were used for the test samples and control samples. Further the fine stream (i.e., stream without large lactose crystals) and coarse stream (i.e., stream including high content of lactose crystals) produced by the air classifier from both the test samples and control samples were analyzed for concentration of protein, ash, moisture and lactose. The results are shown in the Table below.

TABLE

| | Mass (g) | % | Coding | % Protein | % Ash | % Moisture | Lactose % by difference* |
|---|---|---|---|---|---|---|---|
| Test Sample 50:50 | | | | | | | |
| Fines | 47 | 52.40 | Fines #1 | 36.8 | 8.12 | 4.9 | 50.2 |
| Coarse | 42.7 | 47.60 | Coarse #1 | 34 | 7.58 | 4.9 | 53.5 |
| Total Mass, g | 89.7 | 100.00 | — | — | — | — | — |
| Test Sample 60:40 | | | | | | | |
| Fines | 66.2 | 67.28 | Fines #2 | 36.1 | 8.03 | 4.9 | 51.0 |
| Coarse | 32.2 | 32.72 | Coarse #2 | 34.1 | 7.6 | 4.9 | 53.4 |
| Total Mass, g | 98.4 | 100.00 | — | — | — | — | — |
| Control Sample 50:50 | | | | | | | |
| Fines | 76.5 | 52.76 | Fines #3 | 34.7 | 7.73 | 3.7 | 53.8 |
| Coarse | 68.5 | 47.24 | Coarse #3 | 34.2 | 7.71 | 3.7 | 54.4 |
| Total Mass, g | 145 | 100.00 | — | — | — | — | — |
| Control Sample 60:40 | | | | | | | |
| Fines | 58.4 | 60.08 | Fines #4 | 34.7 | 7.72 | 3.7 | 53.9 |
| Coarse | 38.8 | 39.92 | Coarse #4 | 34.6 | 7.6 | 3.7 | 54.1 |
| Total Mass, g | 97.2 | 100.00 | — | — | — | — | — |

*Percentage of lactose was calculated by subtracting from 100% the sum of protein %, moisture %, fat %, and ash % of the samples. For the fat %, it is assumed to be 0 as the samples are derived from skim milk products.

As shown in the Table above, increased amounts of lactose were removed from the test samples using the air classifier as compared to the control sample.

Additionally, particle size distribution and chemical analysis of the fine and course streams post air classification were also analyzed for the test samples and control samples. The results are shown in FIGS. 5A-5F.

EXAMPLE 3

In this Example, dried skim milk products were prepared and analyzed for the development and morphology of α-monohydrate crystals in the products.

α-lactose monohydrate crystals were formed in concentrated skim milk at approximately 40% by weight total solids. This crystallization intended to grow lactose crystals greater than 30 μm by the following series of conditions: 1) reconstitution of skim milk powder (commercially available from Dairy America, Fresno, Calif.), 2) batch pasteurization, 3) crystallization of lactose in concentrated product, and 4) measurement of lactose crystals in concentrated product.

Figure 6:
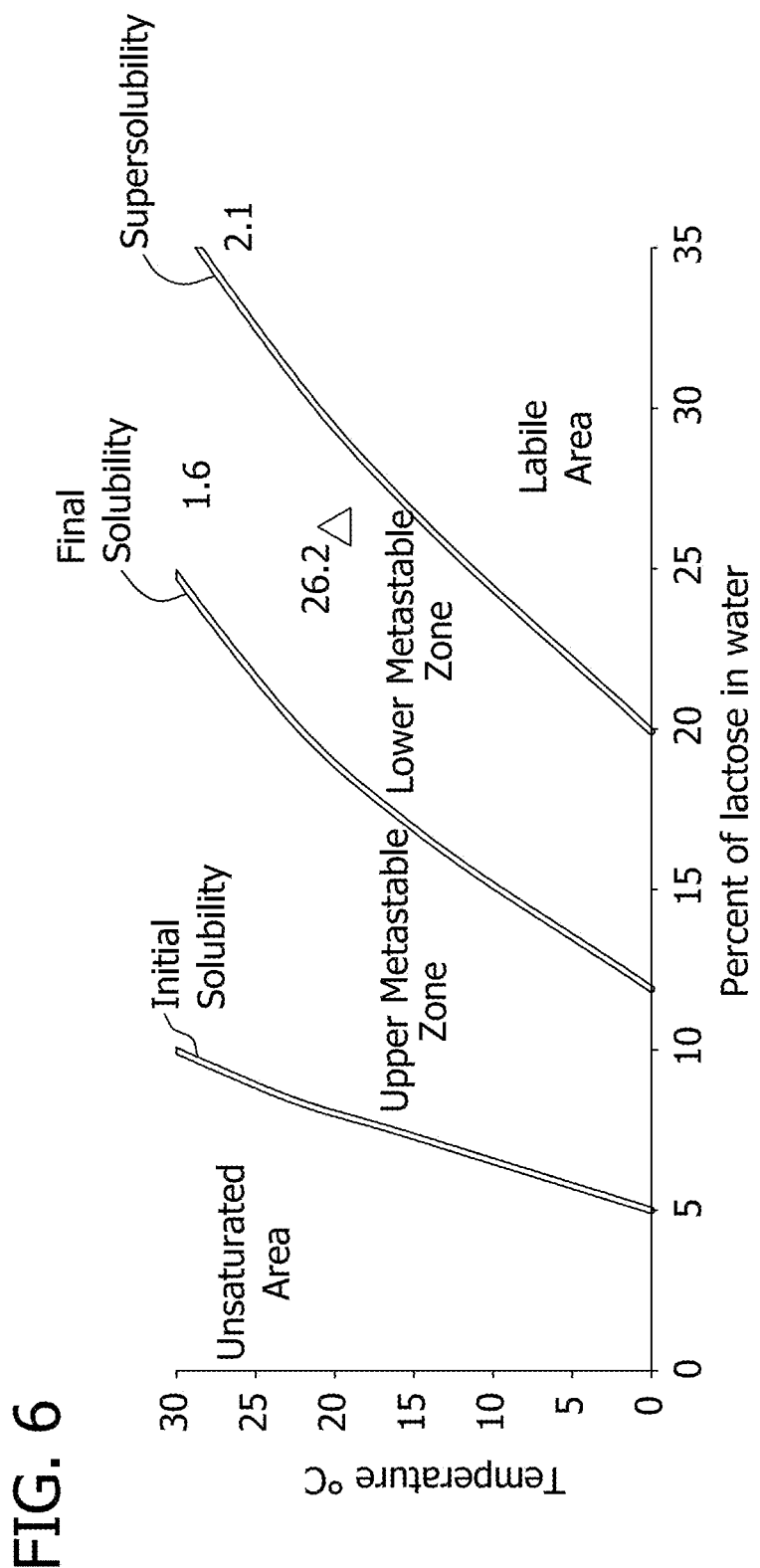
FIG. 6 depicts a lactose supersolubility diagram as used in Example 3.

The concentrated skim milk was prepared from reconstitution of skim milk powder in deionized water, allowed to hydrate for no less than 24 hours under refrigeration conditions. After hydration, concentrated skim milk (total solids content of approximately 40% by weight) was tempered at room temperature for no less than 4 hours, followed by pasteurization at 71° C. for 30 min. After pasteurization, the concentrated skim milk was cooled to 12° C. and then seeded with lactose powder at 0.005, 0.0075 or 0.010 percent w/w. Seeding was required due to the low supersaturation level of lactose at 26.2 percent in water at 20° C. This calculated value exceeded the lactose supersaturation threshold of 18% in water at 20° C. and it is located within the lower metastable zone shown in FIG. 6. The lower metastable zone requires the presence of lactose seeds to promote crystallization within a short period of time. The lower metastable zone also enhances secondary nucleation of lactose from fine crystals. Secondary nucleation results from certain conditions of concentration, temperature and nuclei generated from the contact between crystals, crystallizer walls or stirrer.

Figure 3A:
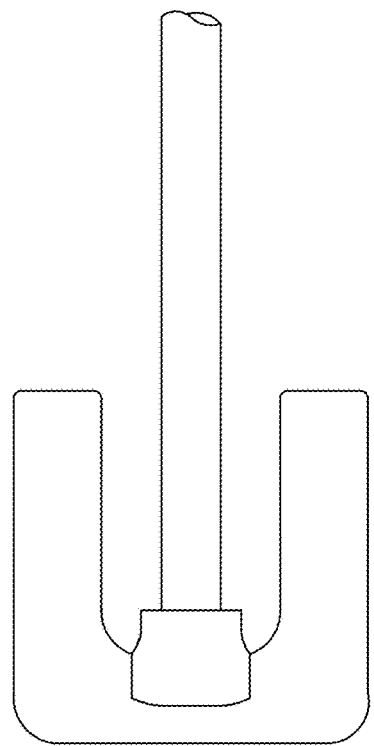
FIGS. 3A and 3B depict exemplary U-shaped agitators for use in the processes of the present disclosure.
Figure 3B:
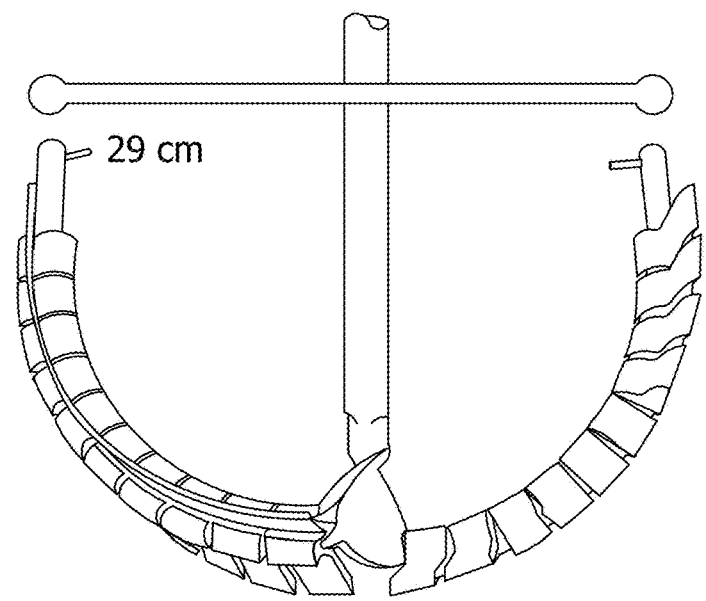
Figure 7:
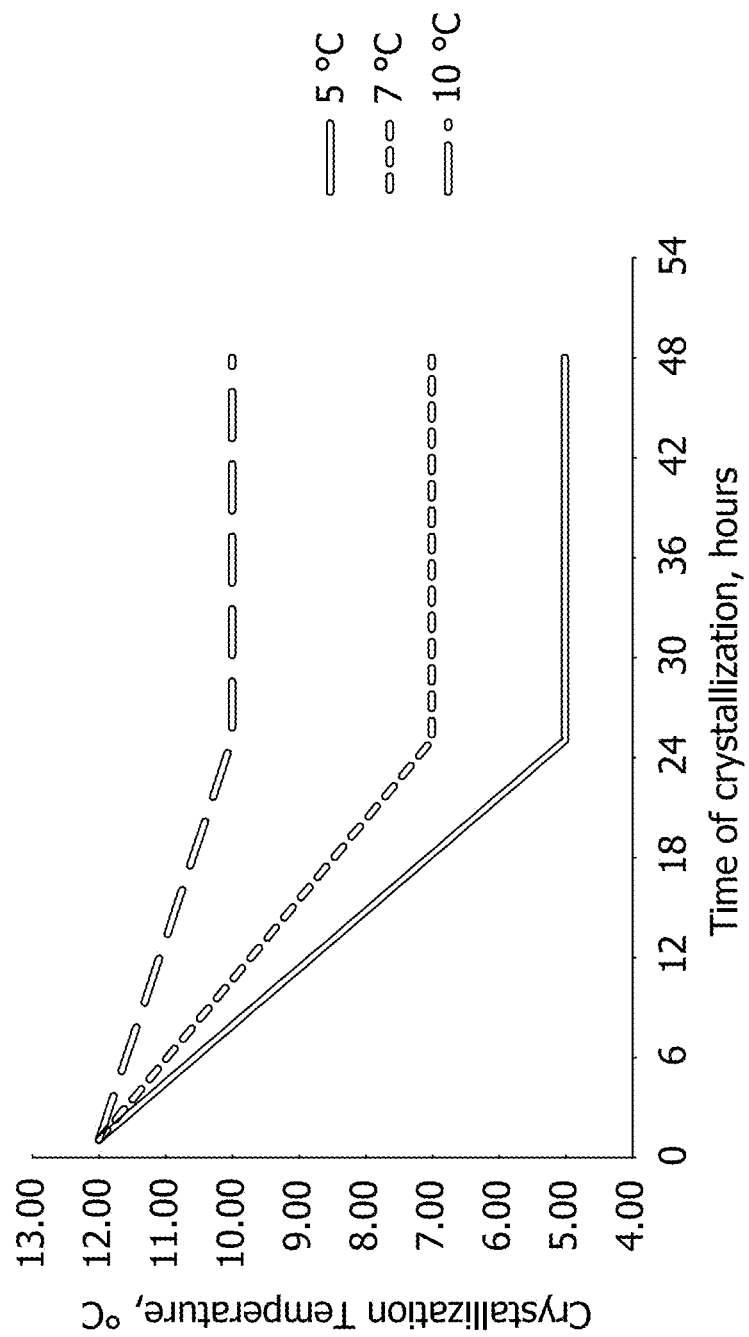
FIG. 7 depicts the applied crystallization cooling rates as analyzed in Example 3.
Figure 8A:
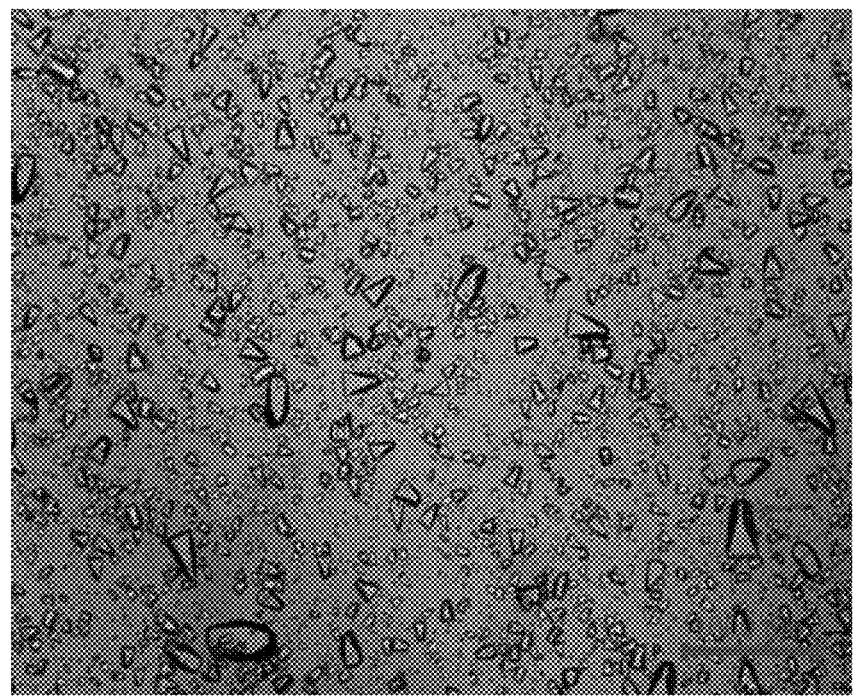
FIG. 8A depicts lactose crystals in concentrated skim milk after 24 hour crystallization as analyzed in Example 3.
Figure 8B:
FIG. 8B depicts lactose crystals in concentrated skim milk after 48 hour crystallization as analyzed in Example 3.

Seed size was selected by using commercial lactose powder (available from Leprino Foods, Denver, Colo.) of commercial size designation at 40, 100 or 200 mesh. Following the concentrated skim milk-lactose seeding, 140 g of sample material was transferred to a 150 ml temperature programmable reactor to initiate crystallization. During crystallization, the sample material was cooled at a rate of 0.2, 0.3 or 0.4° C. per hour and agitated with a speed of 50, 70 or 100 rpm. Agitation was performed with a Caframo anchor paddle as illustrated in FIG. 3A. An alternative paddle for use with the processes of the present disclosure is illustrated in FIG. 3B. Final temperature after cooling was selected at 5, 7 or 10° C., which was also the final holding temperature once cooled from 12° C. The cooling rate of 0.4° C. per hour was used when the final temperature of 5° C. was selected and the cooling rate of 0.3 or 0.2° C. per hour was used when the final temperature of 7 or 10° C. was selected, respectively. FIG. 7 shows the crystallization cooling profiles. Concentrated skim milk with crystallized lactose was sampled for photomicrographs at 24 and 48 hours (FIGS. 8A-8B).

Control sample was prepared from reconstitution of skim milk powder in water and allowed to hydrate for not less than 24 hours under refrigeration conditions. After hydration, 27 kg of control concentrated skim milk (approximately 40% by weight total solids) was tempered at room temperature for not less than 4 hours, followed by pasteurization at 71° C. for 30 min. After pasteurization, control concentrated skim milk was stored under refrigeration conditions for not less than 12 hours before drying. After refrigerated storage, control concentrated skim milk was thermally treated at 50° C. for not less than 15 minutes. This thermal treatment intended to dissolve any crystallized lactose as a result of storage under refrigeration conditions. Following thermal treatment, the control concentrated skim milk was dried in an APV pilot spray drier type PSD55 (available from Aron Equipment Company, Bensenville, Ill.). Collected control sample was sent for air classification through contract services of RSG Inc. (Sylacauga, Ala.). In addition, control sample was fractionated by using sieves of U.S. Standard number 120, 140, 200, and 270, as well as collection pan.

Applied experimental design model for development and morphology of α-lactose monohydrate crystals in a wet solution used a replicated two-level, four factor full factorial design. Factor levels used were crystallization temperature (5 and 10° C.), lactose seeding concentration (0.005 and 0.010% w/w), lactose seed size (200 and 40 mesh), and agitation speed (50 and 100 RPM). The factorial design experimental model is shown in the Table below. Replication of runs facilitated the estimation of variation between runs executed under similar experimental conditions. Additional center points were added to the design intended to determine linearity or curvature of the model. Considered center points included crystallization temperature at 7° C., lactose seeding concentration at 0.0075% w/w, lactose seed size at 100 mesh and agitation speed at 70 RPM. Analysis of data from this experimental design model was performed by regression with the aid of Minitab® 16.2.0 (Microsoft 2010).

TABLE

A $2^4$ Factorial design experiment to study the effect from factors A, B, C, and D in crystallization and growth of lactose crystals greater than 30 μm in concentrated skim milk at approximately 40% by weight total solids

| | | Levels | |
| --- | --- | --- | --- |
| Code | Factors | − | + |
| A | Lactose Seeding Concentration, % | 0.0050 | 0.010 |
| B | Crystallization Temperature, ° C. | 5 | 10 |
| C | Lactose Seed Size | 40 | 200 |
| D | Agitation Speed, RPM | 50 | 100 |

| Standard Order | Center Points | Blocks | Factors | | | |
| --- | --- | --- | --- | --- | --- | --- |
| | | | A | B | C | D |
| | Sample Number | | | | | |
| 1 | R1 | 1 | 2 | 0.0050 | 5 | 40 | 50 |
| 2 | RI | 1 | 1 | 0.0100 | 5 | 40 | 50 |
| 3 | RII | 1 | 1 | 0.0050 | 10 | 40 | 50 |
| 4 | R4 | 1 | 2 | 0.0100 | 10 | 40 | 50 |
| | Run Number | | | | | |
| 5 | RIII | 1 | 1 | 0.0050 | 5 | 200 | 50 |
| 6 | R6 | 1 | 2 | 0.0100 | 5 | 200 | 50 |
| 7 | R7 | 1 | 2 | 0.0050 | 10 | 200 | 50 |
| 8 | RIV | 1 | 1 | 0.0100 | 10 | 200 | 50 |

TABLE-continued

A $2^4$ Factorial design experiment to study the effect from factors A, B, C, and D in crystallization and growth of lactose crystals greater than 30 μm in concentrated skim milk at approximately 40% by weight total solids

| 9 | RV | 1 | 1 | 0.0050 | 5 | 40 | 100 |
|---|---|---|---|---|---|---|---|
| 10 | R2 | 1 | 2 | 0.0100 | 5 | 40 | 100 |
| 11 | R3 | 1 | 2 | 0.0050 | 10 | 40 | 100 |
| 12 | RVI | 1 | 1 | 0.0100 | 10 | 40 | 100 |
| 13 | R5 | 1 | 2 | 0.0050 | 5 | 200 | 100 |
| 14 | RVII | 1 | 1 | 0.0100 | 5 | 200 | 100 |
| 15 | RVIII | 1 | 1 | 0.0050 | 10 | 200 | 100 |
| 16 | R8 | 1 | 2 | 0.0100 | 10 | 200 | 100 |
| 17 | R1 | 1 | 3 | 0.0050 | 5 | 40 | 50 |
| 18 | RI | 1 | 3 | 0.0100 | 5 | 40 | 50 |
| 19 | RII | 1 | 3 | 0.0050 | 10 | 40 | 50 |
| 20 | R4 | 1 | 3 | 0.0100 | 10 | 40 | 50 |
| 21 | RIII | 1 | 3 | 0.0050 | 5 | 200 | 50 |
| 22 | R6 | 1 | 3 | 0.0100 | 5 | 200 | 50 |
| 23 | R7 | 1 | 3 | 0.0050 | 10 | 200 | 50 |
| 24 | RIV | 1 | 3 | 0.0100 | 10 | 200 | 50 |
| 25 | RV | 1 | 3 | 0.0050 | 5 | 40 | 100 |
| 26 | R2 | 1 | 3 | 0.0100 | 5 | 40 | 100 |
| 27 | R3 | 1 | 3 | 0.0050 | 10 | 40 | 100 |
| 28 | RVI | 1 | 3 | 0.0100 | 10 | 40 | 100 |
| 29 | R5 | 1 | 3 | 0.0050 | 5 | 200 | 100 |
| 30 | RVII | 1 | 3 | 0.0100 | 5 | 200 | 100 |
| 31 | RVIII | 1 | 3 | 0.0050 | 10 | 200 | 100 |
| 32 | R8 | 1 | 3 | 0.0100 | 10 | 200 | 100 |
| 33 | CP1 | 0 | 1 | 0.0075 | 7 | 100 | 70 |
| 34 | CP2 | 0 | 1 | 0.0075 | 7 | 100 | 70 |
| 35 | CP3 | 0 | 2 | 0.0075 | 7 | 100 | 70 |
| 36 | CP4 | 0 | 2 | 0.0075 | 7 | 100 | 70 |
| 37 | CP5 | 0 | 3 | 0.0075 | 7 | 100 | 70 |
| 38 | CP6 | 0 | 3 | 0.0075 | 7 | 100 | 70 |

Interpretation of the above columns is as follows: Center point 1 represents the configuration of the factors at their highest or lowest levels. Center point 0 represents the configuration of the factors between their highest and lowest levels. Block 2 represents the first experimental runs. Block 1 represents the second experimental runs, and Block 3 represents the third experimental runs.

Analyzed photomicrographs (FIGS. 8A-8B) from all treatments of crystallized lactose in the concentrated skim milk samples had an average mean crystal size distribution and standard deviation of 74±36 μm at 24 hour and 89±44 μm at 48 hour crystallization. The large standard deviation from these crystal size distributions at 24 and 48 hours was attributed to the secondary nucleation of lactose crystals from contact nucleis. Contact nuclei were generated as a result of crystals colliding with each other, with the walls of the crystallizer or with the stirrer during crystallization.

Factorial design analysis of 24 and 48 hour concentrated skim milk-lactose crystallized samples revealed a significant effect from lactose seed size only during 24 hour crystallization (FIG. 9). Increasing lactose seed size level from 40 to 200 mesh caused an average response increase of 4 μm (P=0.031, α=0.050). This average response increase was attributed to the lower secondary nucleation of lactose from seeded concentrated skim milk with 200 mesh lactose powder. The greater number of lactose seeds from 200 mesh lactose powder provided a larger number of nuclei for crystallization, as compared to 40 mesh lactose powder (see Table below).

TABLE

Correlation between lactose powder mesh size, size in microns, volume, mass and number of seeds per 100 g sample

| Lactose powder mesh size | Lactose seed size, μm | Lactose see concentration, % | Lactose seed volume, mm$^3$ | Lactose seed mass, mg | Number of lactose seeds per 100 g sample |
|---|---|---|---|---|---|
| 200 | 74 | 0.010 | $9.0185 \times 10^{-5}$ | $1.39 \times 10^{-4}$ | 71,768 |
| 200 | 74 | 0.005 | $9.0185 \times 10^{-5}$ | $1.39 \times 10^{-4}$ | 35,884 |
| 40 | 420 | 0.010 | $1.65 \times 10^{-2}$ | $2.55 \times 10^{-2}$ | 393 |
| 40 | 420 | 0.005 | $1.65 \times 10^{-2}$ | $2.55 \times 10^{-2}$ | 196 |

This larger number of nuclei delayed crystal growth by dividing the available supersaturation among the nuclei. Hypothetically, this delay of crystal growth may reduce the formation of large crystals, lowering their probability for contact nucleation. The rate of contact nucleation also increased with an increase in the size of the seeds. The number of lactose seeds was calculated by assuming an average seed size of 74 μm for 200 mesh lactose powder and 420 μm for 40 mesh lactose powder. Conversion of mesh size to microns was performed by using a particle size conversion table from Sigma-Aldrich Co. LLC (2011). In addition to these assumptions, Equation A and Equation B were also used as well as a specific gravity of 1.545 for α-lactose monohydrate.

Equation A: Lactose seed volume $$V=(\pi D^3)/6, mm^3\ D^3=L/1.33$$

where V represents the volume of a lactose seed crystal (mm$^3$) and D represents the diameter of a lactose crystal (μm$^3$). D assumes a spherical shape for a lactose crystal, and it is determined by measuring the length from the longest edge of a lactose crystal, which is also divided by 1.33. The longest edge of a lactose crystal is represented by L, (μm).

Equation B: Number of lactose seeds

Number of lactose seeds=((% lactose seed crystals× concentrated skim milk sample)×1000))/(Mass of the Crystal)

Figure 10:
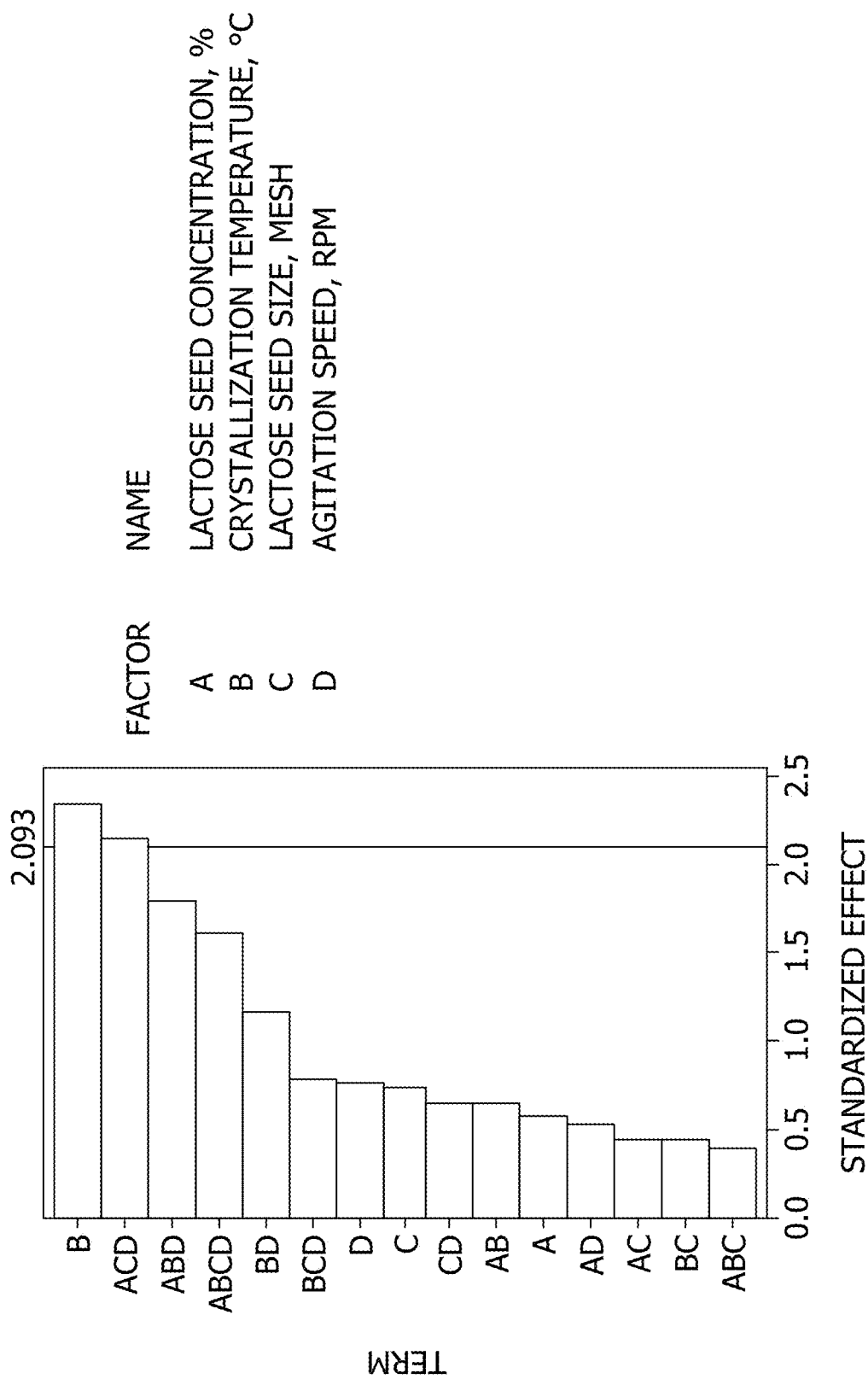
FIG. 10 depicts a chart of standardized effects on 48 hour crystallization response of lactose as analyzed in Example 3.

Factorial design analysis of 48 hour crystallization revealed a significant effect from crystallization temperature. In addition to the significance from crystallization temperature, a marginally significant three-factor interaction was seen between lactose seed concentration, lactose seed size, and agitation speed (FIG. 10). Increasing crystallization temperature level from 5 to 10° C. caused an average response increase of 4 μm (P=0.030, α=0.05). This average response increase was attributed to a lower secondary nucleation of lactose crystals from the crystallization temperature at 10° C. This lower secondary nucleation may relate to the lower rate of crystals growth, which may reduce the probability of contact nucleation. Conversely, crystallization temperature at 5° C. may increase the rate of crystal growth, which increases as the temperature decreased from the solubility point. The increase on the rate of crystal growth from crystallization temperature at 5° C. may enhance the probability of contact nuclei generation, promoting secondary nucleation.

The three-factor interaction between lactose seed concentration, lactose seed size, and agitation speed caused an average response decrease of 3 μm (P=0.045, α=0.05). Interpretation of this three-factor interaction is limited due to its marginal significance on the experimental model and it could be attributed to the aggregate experimental error. Response surface analysis was performed at 24 and 48 hour crystallization. Results from these analyses reflected no significant contribution of the center points at these crystallization time periods, therefore the results are not shown.

Verification of factorial design and response surface analyses for 24 and 48 hour concentrated skim milk-lactose crystallized samples were performed by an analysis of variance. This analysis confirmed the significant effect contribution of lactose seed size during 24 hour crystallization (P=0.031; α=0.05). It also reflected that during 24 hour crystallization the present experimental model is significantly affected by Blocking (P=0.004; α=0.05) (see Table below).

TABLE

Summary of significant effects, coefficients and analysis of variance for 24 hour crystallization response, μm Estimated effects and coefficients for 24 hour crystallization response, μm

| Term | Effect | Coefficient | Significant estimated Coefficient | t | P |
|---|---|---|---|---|---|
| Lactose seeding concentration, % | 4 | 1.772 | 0.7605 | 2.33 | 0.031 |

Analysis of Variance for 24 hour crystallization response, μm

| Source | DF | Seq SS | Adj SS | Adj MS | F | P |
|---|---|---|---|---|---|---|
| Blocks | 2 | 272.286 | 271.703 | 135.851 | 7.34 | 0.004 |
| Lactose seeding concentration, % | 1 | 98.506 | 100.501 | 100.501 | 5.43 | 0.031 |

Blocking was performed as a function of time, where experimental runs for Block 2 were performed three months prior to experimental runs for Block 1. This significant effect from blocking is attributed to data variability between runs. Analysis of variance during 48 hour crystallization confirmed the significant effect contribution of crystallization temperature (P=0.030; α=0.05) and three-factor-interaction between lactose seed concentration, lactose seed size, as well as agitation speed (P=0.045; α=0.05). This analysis also confirmed the second-order response model for 48 hour crystallization (P=0.030; α=0.05), which was attributed to experimental error (see Table below).

TABLE

Summary of significant estimated effects, coefficients and analysis of variance for 48 hour crystallization response, μm Estimated effects and coefficients for 48 hour crystallization response, μm

| Term | Effect | Coefficient | Significant estimated Coefficient | t | P |
|---|---|---|---|---|---|
| Crystallization temperature, ° C. | 4 | 1.905 | 0.8116 | 2.35 | 0.030 |
| Lactose seeding concentration, %/Lactose seed size, mesh/agitation speed, RPM | −3 | −1.743 | 0.8116 | −2.75 | 0.045 |

Analysis of Variance for 24 hour crystallization response, μm

| Source | DF | Seq SS | Adj SS | Adj MS | F | P |
|---|---|---|---|---|---|---|
| Crystallization temperature, ° C. | 1 | 134.85 | 116.091 | 116.091 | 5.51 | 0.030 |

TABLE-continued

Summary of significant estimated effects, coefficients and analysis of variance for 48 hour crystallization response, μm

| | | | | | |
|---|---|---|---|---|---|
| Lactose seeding concentration, %/Lactose seed size, mesh/agitation speed, RPM | 1 | 97.27 | 97.266 | 97.266 | 4.61 | 0.045 |
| Curvature | 1 | 116.59 | 116.594 | 116.591 | 5.53 | 0.030 |

EXAMPLE 4

In this Example, dried skim milk products prepared similar to the products in Example 3 were analyzed after separation of the lactose crystals using an air classifier.

The dried skim milk product sample (also referred to herein as test sample) was prepared from reconstitution of skim milk powder (commercially available from Dairy America, Fresno, Calif.) in deionized water and allowed to hydrate for no less than 24 hours under refrigeration conditions. After hydration, 27 kg of concentrated skim milk (approximately 40% by weight total solids) was tempered at room temperature for no less than 4 hours, followed by pasteurization at 71° C. for 30 min. After pasteurization, concentrated skim milk was cooled to 12° C. and then seeded with lactose powder at 0.005 percent w/w. Seed size was selected by using commercial lactose powder (available from Leprino Foods, Denver, Colo.) of commercial size designation at 200 mesh. Following concentrated skim milk-lactose seeding, the product was transferred to a 57 kg jacketed tank equipped with a modified agitator. This modified agitator reassembled the Caframo anchor shape paddle design and obtained a similar crystal size distribution as the one used in Example 3. The agitator had no contact with the sides of the vessel, thereby preventing shattering of the crystals by mechanical touching. During crystallization, the product was cooled at a rate of 0.4° C. per hour and agitated at 5 RPM. Final temperature after cooling was selected at 5° C., which was also the final holding temperature once cooled from 12° C. Following crystallization, the concentrated skim milk was dried in an APV pilot spray drier type PSD55. Collected dried skim milk product was sent for air classification through contract services of RSG Inc. (Sylacauga, Ala.). In addition, dried skim milk product was fractionated by using sieves of U.S. Standard number 120, 140, 200, and 270, as well as collection pan. Two test runs were performed to guarantee reliable statistical analysis. This fractionation technology was also applied to a control sample.

Applied experimental design model for analyzing the control sample and test sample by lactose crystallization, drying, and air classification used a two-sample t-test comparison with α=0.05. This two-sample design used protein content of control sample and test sample as comparative variables. Experimental design for protein content of air classified streams and sieved fractionated test sample was also compared by a two-sample t-test comparison with α=0.05.

Protein content was analyzed by the Kjeldahl method with 6.38 N as protein factor. This assay is in accordance with the modified versions of standard methods 955.04 and 979.09 from the AOAC INTERNATIONAL, 18th Ed. Ash content was analyzed with a modified version of the standard method 923.03 from the AOAC INTERNATIONAL, 18th Ed. Moisture content was analyzed with a modified version of standard method 15.111 from Standard Methods for the Examination of Dairy Products (Wehr, H. M. and Frank, J. F. 2004). Lactose content was determined by difference from the sum of the percentages of protein, moisture, ash and fat. Fat content was assumed to be 0.05 percent. Microbiological analysis by petrifilm aerobic plate count was done to monitor the absence of microbiological influence on the system.

Chemical analysis of test sample fine stream reflected a protein content significantly greater than the control sample fine stream (P=0.031; α=0.05). The average protein content of test sample fine stream was 36.2% w/w and 35.6% w/w for control fine stream (see Table below).

TABLE

Average chemical composition of air classified streams after 50:50 cut size

| | Product Description | | | |
|---|---|---|---|---|
| | Fine Stream | | Coarse Stream | |
| | Protein, % | Lactose, % | Protein, % | Lactose, % |
| Control Sample | 35.6 ± 0.14 | 54.8 ± 2.62 | 35.4 ± 0.21 | 53.3 ± 0.11 |
| Test Sample | 36.2 ± 0.23 | 51.9 ± 1.07 | 34.6 ± 0.06 | 53.9 ± 0.72 |

This greater protein content from test sample fine stream was attributed to the presence of crystallized lactose in the feed stock. Crystallized lactose contributed to the displacement of coarse particles by means of air classification. Air classification used physical forces such as centrifugal, collision and aerodynamic drag to take advantage of the shape and size of the crystals.

Further protein fortification could be obtained in the test sample fine stream than the currently gained. Two-sample t-test comparisons of mean crystal size distributions prior— (102±43 μm) and post-heating (91±39 μm) reported a significant reduction of mean crystal size distribution post-heating (P=0.000; α=0.05). This significant reduction of mean crystal size distribution from post-heated lactose crystallized concentrated skim milk or spray drier feed material was attributed to an increase of the lactose solubility. The increase of the lactose solubility related to heating of feed material with a temperature range of 21 to 32° C. and held for approximately 10 min. Heating was performed with the intent to overcome the limiting processing capacities from the APV PSD55 drier, which was not capable of operating with a feed material at 5° C. and with an approximated 40% by weight total solids. This operational drawback could be prevented by increasing the processing capacity of the drier, or by employing a spinning-disk atomizer, or by the combination of both. A greater processing capacity of the drier can extend the residence of the droplets in the drying chamber, consequently compensating for their low rate of evaporation. The low rate of evaporation of the droplets is correlated to their total solids content, feed temperature and size.

The elevated total solids content of the droplets reduced their convective heat transfer with the drying medium, obscuring their water diffusion. Water diffusion is also affected by temperature of the feed material, which affects the amount of energy required to evaporate the water from the droplets. An additional factor influencing the rate of evaporation is the size of the droplets. The size of the droplets is correlated to their surface to mass ratio, and this can improve the water diffusion with the exhaust air by increasing the surface to mass ratio. This increase on surface to mass ratio improves the drying capacity of the droplets and reduces the amount of energy required. The size of the droplets can be controlled by the peripheral speed of a spinning-disk atomizer or by the degree of atomization from the swirl-type pressure nozzle. The flexibility of the spinning-disk atomizer makes it ideal for this type of application in which the feed material has high total solids and crystallized lactose.

Figure 11:
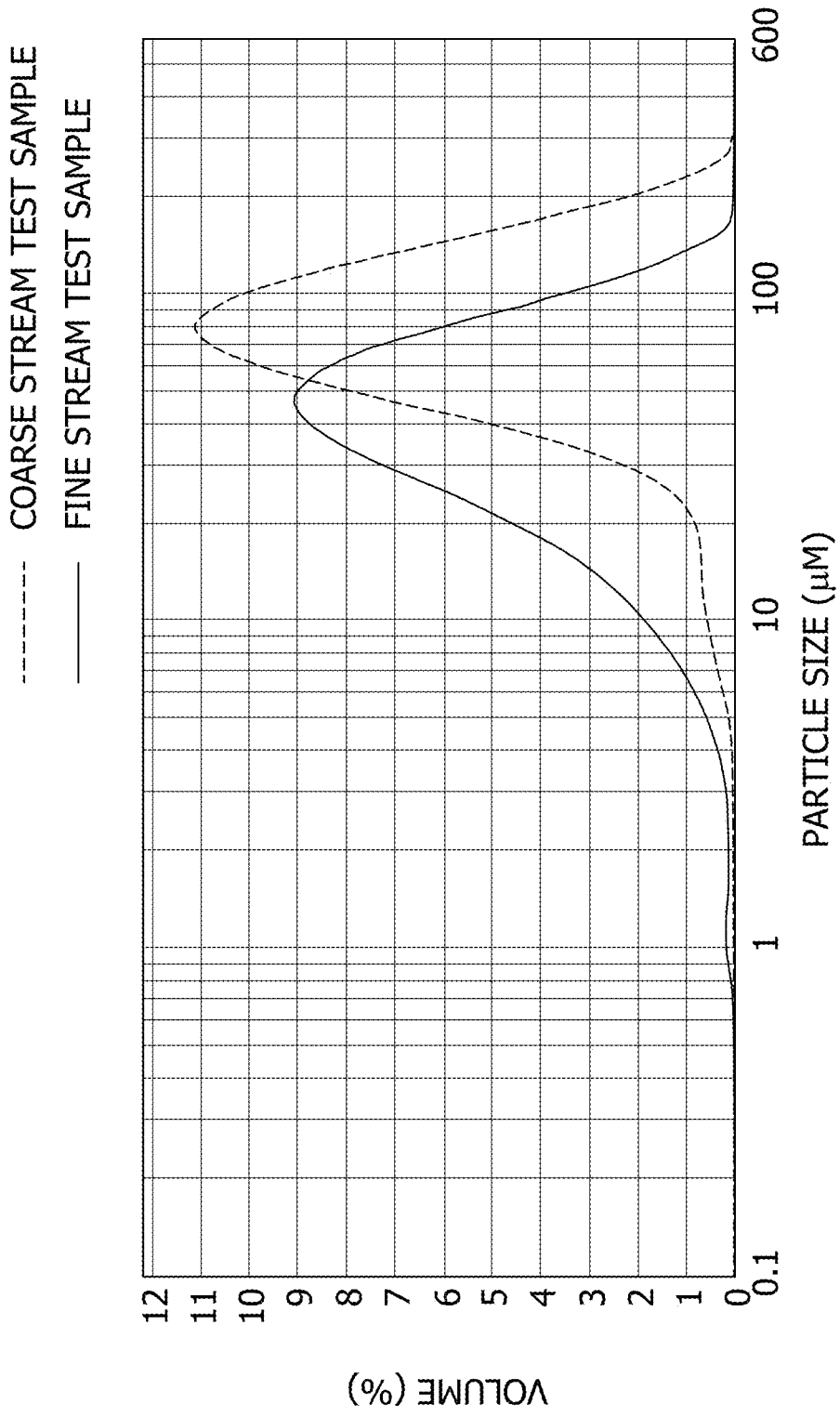
FIG. 11 depicts particle size distribution for coarse stream test sample and fine stream test sample as analyzed in Example 4.

Measurements of particle size distributions by laser scattering using a Malvern 2000 (available from Malvern Instruments, Worcestershire, UK) of feed stocks from powdered control and test sample prior to air classification reflected a $D_{[4,3]}$ of 56.08 μm for the former and 58.86 μm for the latter. Two outcome streams resulted from the air classification of these feed stocks with a 50:50 cut size (see Table; FIG. 11). First outcome, fine stream with a $D_{[4,3]}$ of 41.30 μm for control sample and 44.96 μm for test sample. Second outcome, coarse stream with a $D_{[4,3]}$ of 85.58 μm for control sample and 85.92 μm for test sample.

TABLE

Average particle size distributions of feed stock, fine stream and coarse stream of control sample and test sample

| Sample Description | $D_{[4,3]}$, μm | D(0.1), μm | D(0.5), μm | D(0.9), μm | Uniformity |
|---|---|---|---|---|---|
| Control Feed Stock | 56.08 | 11.52 | 46.19 | 112.60 | 0.6924 |
| Control Fine Stream | 41.30 | 9.50 | 34.76 | 82.88 | 0.6588 |
| Control Coarse Stream | 85.58 | 26.16 | 74.90 | 157.88 | 0.5394 |
| Test Sample Feed Stock | 58.86 | 14.82 | 51.32 | 112.04 | 0.5924 |
| Test Sample Fine Stream | 44.96 | 12.16 | 39.90 | 85.10 | 0.5664 |
| Test Sample Coarse Stream | 85.92 | 34.62 | 78.16 | 149.24 | 0.4552 |
| Test Sample Second-Cut Stream | 53.42 | 16.94 | 48.98 | 95.66 | 0.49 |

FIG. 11 depicts apparent bypass of particles, which refers to the amount of particles that bypasses the cut size, from the fine stream into the coarse stream. The effect of apparent bypass on the coarse particle size distribution can be reduced by performing a second separation of the coarse stream. Measurement of particle size distribution by laser scattering of second separation or second-cut test sample fine stream with a 60:40 cut size (60% coarse and 40% fine streams) reflected a $D_{[4,3]}$ of 53.42 μm. In addition, second-cut test sample fine stream had a mean protein content of 35.3% w/w, which was not significantly greater than the mean protein content from control sample (P=0.880; α=0.05). These results reflected that 60:40 second-cut was not able to further increase the protein content from second-cut test sample fine stream.

The protein content from air classified streams versus protein content from sieve fractionated test sample was analyzed. Results from this analysis reflected a difference among protein contents at a 0.05 level of significance. This significant difference was attributed to lower protein content from the air classified coarse stream as compared to the protein content from sieve fractionated streams. This finding reflected that air classification, in contrast to sieve fractionation, is capable of separating fine particles with increased protein, and allocating them in the air classified fine stream. In addition to this analysis, the protein content from sieve fractionated streams versus the protein content from air classified fine streams was analyzed. Results from this analysis did not have enough evidence to conclude a significant difference. Furthermore, protein content between sieves did not have enough evidence to conclude a significant difference at 0.05 significant level.

EXAMPLE 5

In this Example, dried skim milk concentrates were prepared and seeded with lactose. The lactose crystals produced therefrom were analyzed.

The dried skim milk concentrate was prepared by placing a skim milk concentrate into a rotary evaporator for a sufficient period for the concentrate to reach approximately 40% by weight total solids. Dissolved sugar, expressed in ° Brix was measured using a hand-held refractometer and the sugar content was adjusted by adding distillated deionized water to the concentrate. The evaporated skim milk concentrate was conditioned in a 250-mL beaker cooled to 12° C. and then seeded with 200 mesh α-lactose monohydrate crystals at a 0.010% w/w concentration. During crystallization, the sample material was cooled at a rate of approximately 0.4° C. per hour and agitated at a speed of 20 RPM using a U-shaped agitator similar to that used in Example 3. This preparation method was replicated four times, producing four samples of skim milk concentrate.

Skim milk concentrate with crystallized lactose was sampled for photomicrographs at 24 hours. Cystallographic analysis of the lactose crystals was conducted by analyzing photomicrographs taken using a Nikon 2mp digital camera with support software, NIS Elements F Package, and evaluated with Image J 1.44i software. The results are shown in FIG. 12.

Figure 12:
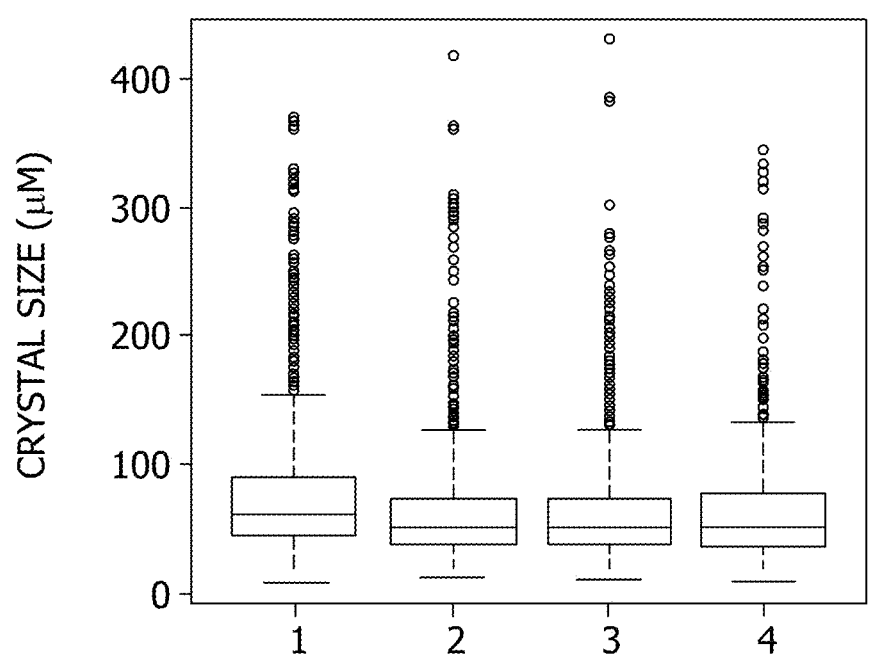
FIG. 12 depicts box plots of mean crystal size of lactose crystals formed and analyzed from skim milk concentrate in Example 5.

As shown in FIG. 12, the mean crystal size from samples 1-4 ranged from 62.2040 to 75.6518 μm, with a standard deviation of approximately 47.0473 μm. These results demonstrate a consistency in the performed lactose crystallization process under the stipulated conditions.

What is claimed is:

1. A process for preparing a dried, protein-fortified milk or whey product having reduced lactose content, the process comprising:
    pasteurizing a milk or whey solution to generate a pasteurized solution;
    cooling the pasteurized solution to generate a cooled solution;
    crystallizing lactose in the cooled solution to generate a solution comprising lactose crystals;
    spray drying the solution comprising the lactose crystals to produce a dried milk or whey product; and
    separating the lactose crystals from the dried milk or whey product to form the dried, protein-fortified milk or whey product.

2. The process of claim 1 wherein the milk or whey solution is pasteurized at a temperature of from 66° C. to about 150° C. for a period of from about 5 seconds to about 30 minutes.

3. The process of claim 1 wherein the milk or whey solution is pasteurized at a temperature of about 71° C. for a period of about 30 minutes.

4. The process as set forth in claim 1 wherein the pasteurized solution is cooled to a temperature of 12° C. or less.

5. The process of claim 4 comprising further cooling the cooled solution at a cooling rate of from about 0.2° C. to about 0.4° C. per hour continuously over a period of from about 12 hours to about 48 hours to allow for crystallization of lactose in the cooled solution.

6. The process of claim 5 wherein the cooled solution is further cooled to a temperature of from about 5° C. to about 10° C.

7. The process of claim 1 further comprising seeding the cooled solution to crystallize lactose in the cooled solution.

8. The process of claim 7 wherein seeding the cooled solution comprises introducing from about 0.005% by weight to about 0.010% by weight lactose crystals to the cooled solution.

9. The process of claim 1 wherein the solution comprising the lactose crystals is spray dried at a temperature of from about 150° C. to 220° C.

10. The process of claim 1 wherein the lactose crystals are separated from the dried milk or whey product using an air classifier.

11. The process of claim 1 wherein the milk or whey solution is an aqueous liquid skim milk solution.

12. The process of claim 11 wherein the aqueous liquid skim milk solution has a solids content of about 38-42% by weight.

13. The process of claim 1 wherein the milk or whey solution is a whole milk solution.

14. The process of claim 1 wherein the milk or whey solution is a whey solution.

15. The process of claim 1 wherein the milk or whey solution is a whey permeate solution.

\* \* \* \* \*